Jan. 4, 1949. R. O. WOOD 2,458,327
PRODUCTION OF MOLDED ARTICLES
Filed Sept. 20, 1943 3 Sheets-Sheet 1
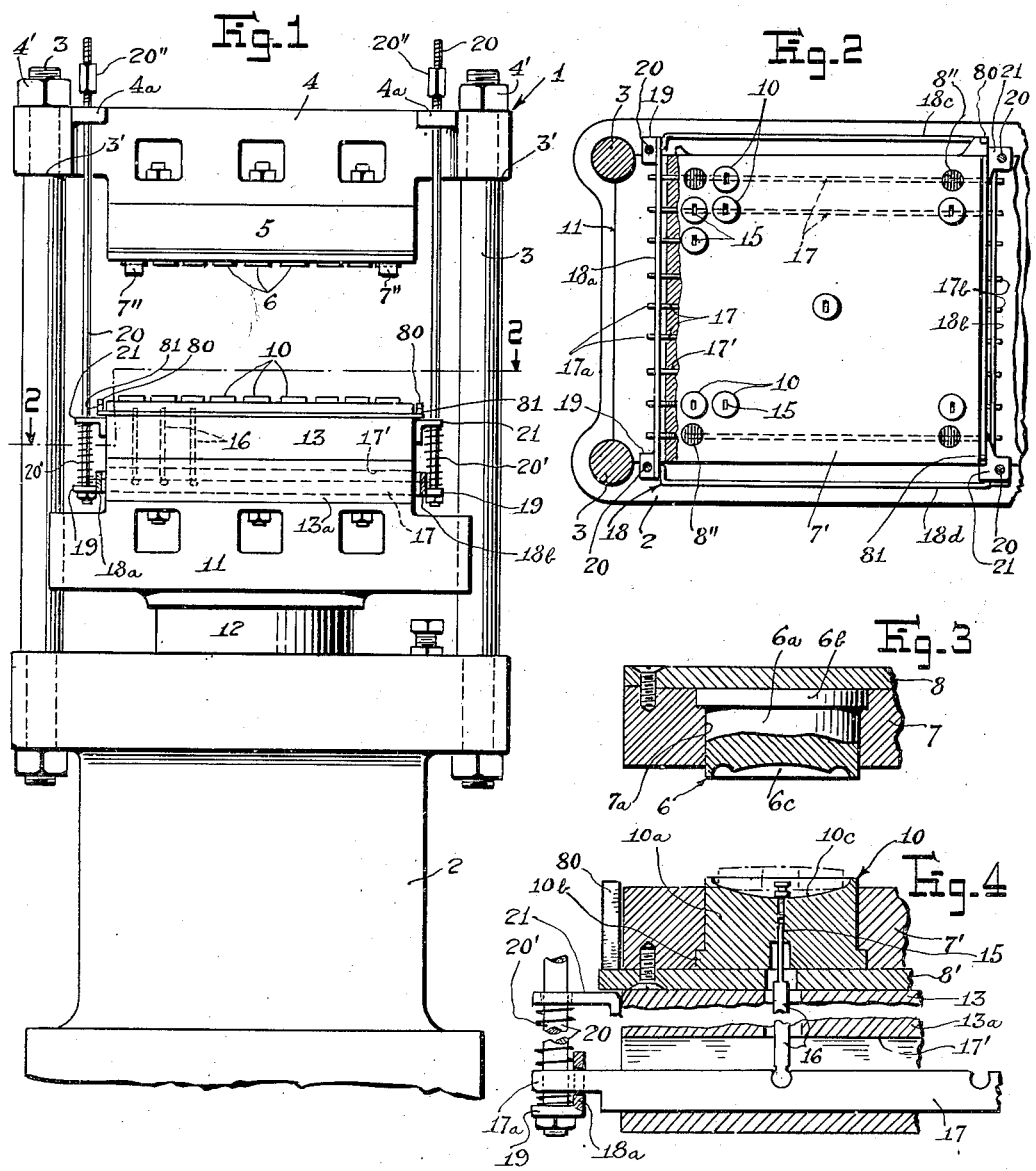

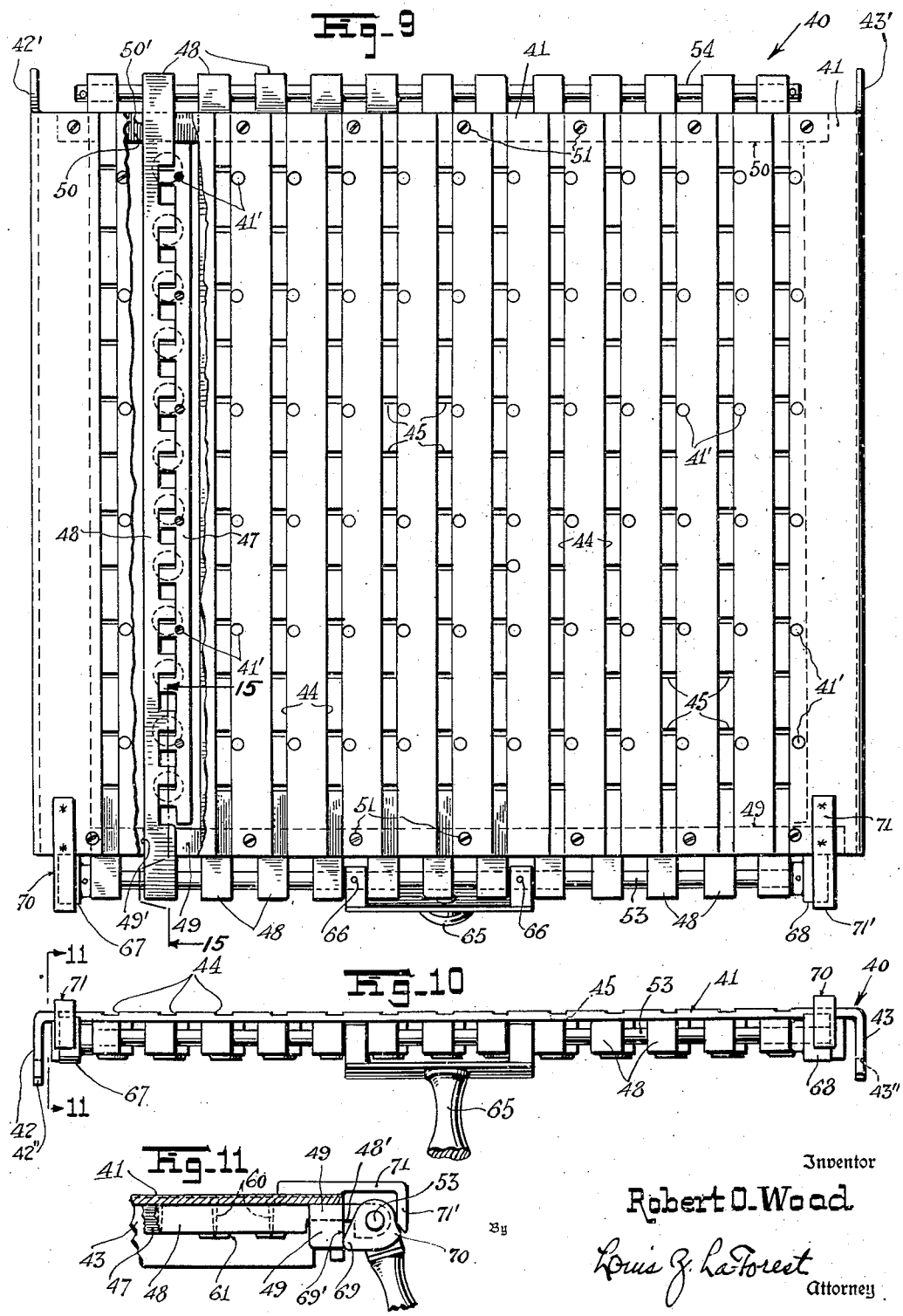

Jan. 4, 1949.                R. O. WOOD                2,458,327
PRODUCTION OF MOLDED ARTICLES
Filed Sept. 20, 1943                            3 Sheets-Sheet 3
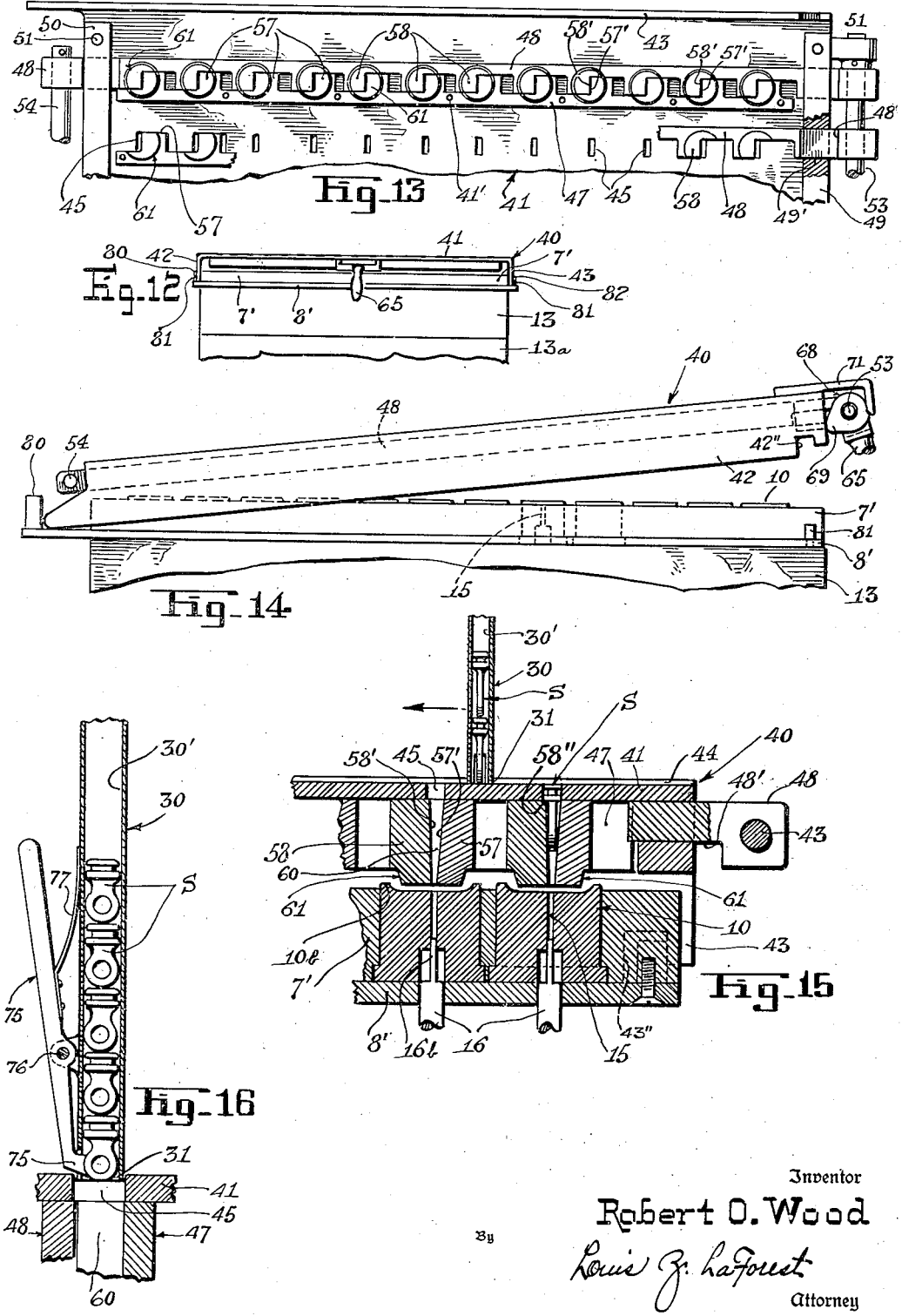
Inventor
Robert O. Wood
By Louis B. Lafourst
Attorney Patented Jan. 4, 1949

2,458,327

UNITED STATES PATENT OFFICE 2,458,327

PRODUCTION OF MOLDED ARTICLES

Robert O. Wood, Upper Montclair, N. J.

Application September 20, 1943, Serial No. 503,119

8 Claims. (Cl. 18—1)

My present invention relates to the art of molding, and particularly to the molding of plastic articles having metallic inserts which are joined to said articles during the process of forming the same in the molds.

While my invention may find application in diverse forms of plastic molding, I illustrate the same in connection with the molding of buttons having metallic inserts projecting thereof in the form of loops or so-called shanks, which provide the means for sewing the buttons on a garment. At the present time, there is a great demand for these metal-shank buttons as they are required for use on the uniforms of the armed forces of the United States. However, the production of these buttons is greatly hampered by the lack of a proper method and means for quickly loading the mold which produces them.

My invention is thus particularly concerned with a novel method and the means for quickly handling and distributing the inserts or shank-forming members with respect to their placement in the mold before this latter is closed to form the buttons.

As is well known, buttons are produced or molded from different molding compounds, for instance, as may be derived from the condensation of phenolics and or ureas with formaldehyde, and processed into powdered material for the purpose of molding. When such material is placed into the heated cavities of a mold and great pressure is applied thereto, it first plasticizes and subsequently cures or hardens to thus be transformed into substantial and durable bodies. Buttons produced by the above process are generally given shape or are molded by means of what is known as a compression molding machine. Such a machine is basically a large hydraulic press having adaptation for molding in a gang, that is, for forming a large number of buttons in one cycle or operation. A machine or press of this character usually comprises a stationary head and a hydraulically movable ram adapted for movement against the head member. There is a heavy heated facing plate secured to each of these associating members, and onto these plates there are provided the multiplicity of die-means. For example, a typical arrangement of the die-means consists of the provision of a large number of cavities in the face of one plate and a similar number of aligning cavities in the face of the other plate, so that the cavities of one plate will match the cavities of the other and thereby form a large number of stations; each station of course serving to form or shape a button when the press is closed or cycled.

When a press or gang-mold of the character described above is used for producing a common type of button—one without a loop or metallic shank projecting from its back—the loading of the die-means or of the press with the molding material is a comparatively simple and well known operation. However, in producing a metal-shank button, such as has been mentioned above, the loading of the press involves a problem which greatly affects production. This may be understood by the consideration of the fact that there must be distributed in proper position in each of the many stations—commonly several hundreds—an irregularly shaped shank-forming member before the regular loading of the stations is had with the molding powder or material. The shank-forming member is, of course, partially to be imbedded in the button and partially to project therefrom and thus is naturally irregular in shape. Prior to my invention, it has been customary directly to manipulate each shank-forming member in position with respect to each station, thus causing a marked loss of time between cycles of the press.

It is a broad object of my invention to provide an improved method and novel means for use in plastic molding.

Another object is to provide an improved method and the means for simultaneously handling a large quantity of small irregularly-formed members adapted for distribution in the die-means of a gang-molding machine.

Another object is to provide a novel loading device for use in connection with molding.

A further object is to provide a mold loading device having accurate and simple means for registering with the face plate of a mold.

A further object of my invention is to provide a particularly shaped lug for use as a shank-forming member in molding buttons.

With the above and other objects in view the invention is carried out in the use of a construction and arrangement of parts designed from a standpoint of economy and effectiveness, as will be hereinafter fully described, illustrated in the accompanying drawing, and set forth in the appended claims.

In the drawing:

Figure 1 is an elevational view of a typical gang-molding machine used in connection with my invention.

Fig. 2 is a sectional view taken along the line 2—2 of the machine of Fig. 1.

Figs. 3 and 4 are detail views of the die-means used in the molding machine of Fig. 1.

Fig. 5 is a cross-sectional view of a typical button produced in the manner of my invention.

Fig. 6 is a bottom view of the button of Fig. 5.

Fig. 7 is a detail view of the especially designed lug or metallic insert which I use for forming the shank of the button of Fig. 5.

Fig. 8 is a view of the preform or the material used to form the body of the button.

Fig. 9 is a plan view, with a part thereof in section, showing the mold loading device of my invention.

Fig. 10 is a front view of the device of Fig. 9.

Fig. 11 is a view along line 11—11 of Fig. 10.

Fig. 12 is a miniature view of the device of Fig. 10, drawn in position over the plate of the press of Fig. 1.

Fig. 13 is a fractional bottom view of the device of Fig. 9.

Fig. 14 is a view showing the device of Fig. 10 in a registering position with the plate of the mold of Fig. 1.

Fig. 15 is an enlarged view taken along line 15—15 of Fig. 9, when the device of that figure overlies the die-plate of the mold of Fig. 1.

Fig. 16 shows the lug-holding means which I use in connection with my loading device shown in Figs. 9 and 10.

In order that my invention may be more fully understood, I now make reference to the accompanying drawing and first invite attention to Figs. 1, 2, 3 and 4, which show the conventional molding press used in connection with my invention. This press is generally indicated as 1 and it has a base 2 from which project the four upstanding corner guide posts 3. These are shouldered at 3', to provide suitable rests for the head 4 which is held stationary thereonto by the nuts 4'. The under part of this head is provided with the usual steam-heated plate 5, and the face of this plate is arranged to receive or hold the die-means 6 which are adapted to shape the upper halves or faces of the buttons when the press is closed. As an example, there is seen in Fig. 3 one of the upper die-means 6 just mentioned. Such means comprises a circular block or body 6a having a surrounding shouldered portion 6b and the central cavity 6c, which latter is given configuration by sinking or turning the face of the block in the manner shown. This cavity is to form the face B' of the button B shown in Fig. 5. All of the upper blocks or dies 6 are held in position by placing the same invertedly into the suitably shouldered openings 7a provided in the master plate 7 and by a backing plate 8 resting against the upper face of the plate 7, as is shown in Fig. 3. Actually the two plates 7 and 8 are screwed together as a unit and then bolted to the steam-heated headplate 5 above mentioned.

The lower die-means 10, which are adapted to cooperate or mate with the upper die-means 6 so as to form the lower halves or what is known as the back of the buttons, are carried on the face of the movable bed-plate 11. This plate is guided for movement by the corner post 3 above mentioned, and the movement thereof is derived from its connection with the hydraulically movable ram 12 located in the base 2 in the manner shown. There is also a steam-heated plate, such as 13, associated with the bed-plate 11, and it is on this plate 13 that the lower dies 10 are fastened and arranged for alignment with the dies 6. Essentially, the dies 10 are similar in construction to the upper dies 6. They comprise each a circular body 10a having the surrounding shouldered portion 10b, and the particularly chosen recess or cavity 10c, such as would form the back B'' of the illustrated button of Fig. 5.

All of the dies 10 are mounted in a plate 7' backed by the plate 8', as shown in Fig. 4. When the lower dies are so mounted, the plates 7' and 8' are screwed together and bolted to the surface of the plate 13, to thus complete the die-means of the press. In order properly to align the dies 6 and 10, there are provided the guide pins 7'' which project from the face of the plate 7, and which register with the apertures or holes 8'' made in the face of the bottom plate 7', as is shown in Figs. 1 and 2.

When molding a common button—one without a metallic loop or shank—the equipment of the press is complete as has been described above. However, in the molding of a button with a metallic insert, as in the instant case, further means must be provided in connection with the lower die 10, so as to accommodate the insert or shank-forming member and so as to permit the ejection of the button after it is molded. Such means will now be described.

As seen in Figs. 1, 2 and 4, there is provided through the central portion of a die-member 10 a vertically extending slot 15, which is suitably formed to receive and hold the shank-forming lug S made in accord with my invention and illustrated in Fig. 7. Normally resting in the lower portion of the slot 15, there is provided the so-called knock-out pin 16 which is adapted for ejecting the button. There is of course a slot 15 and knock-out pin 16 for each die 10 in the press 1.

The means, operative to control the knock-out pins 16, comprises a plurality of cross-bars 17 which are located into respective slots 17' made into a lower extension 13a of the plate 13, as is shown in Figs. 1, 2, and 4. These cross-bars have their ends 17a and 17b engaging the respective side-members 18a and 18b of a square frame 18, which is provided for controlling said bars. The frame 18 is completed by the front and back members 18c and 18d, and it has corner-ears 19 perforated to receive the supporting rods 20. These rods are guided, at their upper ends, by the bosses 4a projecting from the head 4, and at their lower end, by the brackets 21 welded onto the plate 13a; the rods further extend to be secured to the ears aforementioned. Normally, the frame 18 is constrained by the compression springs 20', surrounding the rods 20, to a lower position which is defined by the bars 17 engaging the bottom of the slots 17' in the extension 13a. However, the rods 20 have stop-members 20'' at their upper ends, and when the ram 12 is let down, to its lowermost position, the rods hold the frame 18 against downward movement, thus compressing the springs and causing the knock-out pins 16 to move up into the slots 15 and thereby forcefully ejecting the finished buttons from the cavities 10.

In the structure thus far described, there is seen a molding machine or gang-mold capable of producing, en masse, a molded article such as the button illustrated in Figs. 5 and 6, which button, as will be noted, has the metallic insert or lug S integrally molded therewith. The shape of this lug and the means for handling the same in quantity to expedite the mass-production of the illustrated button in the gang-mold described will now be explained.

The previously mentioned shank forming member or lug S shown in Fig. 7 is provided with the head portion 25 and the loop or projecting flat portion 26. The portion or head 25 is grooved therearound, as at 27, so that when it is imbedded in the body of the molded button the groove will serve as jointing means firmly to secure the lug to the button. As seen, the head 25 is made rectangular in cross-section, see Fig. 6, although it may be made circular in this respect if other means are provided as hereinafter mentioned. It is a particular object however that said head be uniform and long enough to guide the lug, that is, when this latter is inserted to slide through a restricted passage such as through the rectangular-shape bore 30' of the tubular magazine 30 shown in Fig. 16. The head conforming with the bore so as to prevent the lug from tumbling. By such provision, a large number of lugs may be slid, in file, through the magazine by simply inserting the lugs through one end of said magazine. The insertion of the lugs may be accomplished by means of a so-called hopper or by hand if desired. The lower or outlet-end 31 of the magazine 30 may then be used to quickly distribute the lugs. In accordance with the method of my invention, the lugs of the magazine 30 are first distributed into a rack or what may be termed a loading device. This loading device will now be described in detail.

As illustrated in Figs. 9 through 16, the loading device 40 of my invention comprises a plate 41 which is approximately the size of the aforementioned mold plate 13. Along its sides, the plate 41 is bent at right angle to form the runners or legs 42 and 43 which are adapted for supporting and guiding said plate as hereinafter described. The face of the plate 41 is provided with a series of comparatively shallow grooves 44, which extend from front to back of said plate and which have a width of a dimension properly to fit the lower or outlet-end 31 of the tube 30, in the manner seen in Fig. 16 and hereinafter more fully explained. At predetermined distances in all of the grooves 44, there are provided the rectangular-shaped apertures 45, which are so dimensioned as to permit passage therethrough of the head portion 25 of the lug S. The arrangement of the series of grooves 44 in such that a groove will overlie a row of the aforementioned dies 10, and that a slot 45 will directly overlie a respective die 10 in the row. In Fig. 2, the number of dies 10 is merely illustrative, but it is to be understood that the number of the same is equal to the number of apertures 45. Thus, by properly positioning the plate 41 of the device 40 over the plate 13, there will be an opening 45 overlying each slot 15 of a die 10. The apertures 45 are provided to receive the lugs S from the magazine 30, and the grooves 44 are provided to guide said magazine in order quickly to fill or load the device with the lugs. The loading of the device 40 is accomplished when this latter is away from the press 1, and thus means must be provided to retain the lugs in said device until it may be brought to position over the bed-plate 13, whence the device is manipulated to release the lugs and cause their transfer into the press 1. The mechanism employed for the purpose just stated is now to be described.

From Figs. 9 and 10, there will be seen, underlying each of the longitudinal grooves 44 of the plate 41, a pair of toothed members or bars, designated as 47 and 48. The bar 47 is riveted to the plate 41 as at 41' and is thus stationary with said plate, but the bar 48 is slideably movable under the plate and thus also movable with respect to its companion bar 47. In order to guide all of the movable bars 48, there is provided the transversing front rib 49 and back rib 50, each secured to the under side of the plate 41 by the screws 51 and respectively slotted at 49' and 50' to permit passage of and guide all the bars 48. The bars 48, in turn, are notched at 48' to cooperate with the slots provided into the cross-ribs 49 and 50; the notches 48' are formed in a manner to cause a restricted or limited longitudinal movement of the bars 48 with respect to the plate 41. All of the bars 48 are adapted to move together as a unit, and thus they are secured together as by the front rod 53 and the back rod 54; each rod passing through the respective front or back extended ends of the bars 48 so as to hold the bars in one assembly. The unitary movement of the bars 48 is provided for the simultaneous releases of the lugs 25. Normally, the bars 48 are biased to a position for retaining the lugs, but when urged to move to their other limit defined by the length of the notches 48' in cooperation with the cross bars 49 and 50 they release the lugs and then further cooperate with the associated bars 47 to guide the lugs in the slots 15.

In Fig. 13, there is illustrated in detail one set or pair of the bars 47 and 48, as these are arranged underneath the plate 41 for either retaining or releasing the lugs which are placed in the device 40. As seen the bar 47 is provided with a series of off-set teeth 57, each of which is adapted to cooperate with an adjacent tooth of another series of similarly off-set teeth 58 provided on the companion slide-bar 48. The arrangement provides that a pair of such cooperating teeth, 57 and 58, be positioned in relation or alignment with an aperture 45; and that the respective adjacent faces 57' and 58' of said pair of teeth be slightly inclined to form a pocket or channel 60 in substantial alignment below the said aperture, as is seen in Fig. 15. In the normal position of the slide-bar 48, all of the faces 58' of the teeth 58 above mentioned are in closer cooperation with the complimenting faces 57' of the teeth 57, and thus adapted to cause the pockets or channels 60 to restrict the passage of the heads of the lugs therebetween. The restriction caused by each such pair of faces is however permissive for a lug to be dropped in the aperture 45 but to be retained, as by the engagement of the head of said lug with the shoulder 58'' of the tooth 58. It may be presently noted that when so retained a lug will have the top of its head flush with the bottom of the groove 44. Underneath each set of two adjacent teeth 57 and 58 there is formed the respective semicircular bosses 61, which serve to cooperate in extending each individual pocket 60 so that it may closely communicate with its respective slot 15 in a die 10, that is when the device 40 is placed in position over the bed-plate 13, in the manner illustrated in Fig. 15.

When the lugs in the device 40 are retained in the manner explained above, the bars 48 are in their most forward position. Consequently, movement of the bars rearwardly will cause the faces 57' and 58' to separate and the channels or pockets 60 to widen and thus release the lugs. I have provided a common means—in the form of a pivoted handle 65—for controlling the simultaneous and uniform movement of the bars 48. This handle is pinned, as at 66, to the mid-section of the front rod 53, and, when the handle is moved angularly with respect to the device 40, said handle will cause a rotation of the rod. Secured to each end of the rod 53, there are provided the cams 67 and 68, which have each the respective portions 69 and 70 adapted to cooperate respectively with the face 69' of the forward rail 49 and a finger 71' downwardly extending from a bracket 71 secured, as by welding, to the plate 41. By this arrangement it will be obvious that movement of the handle, say upwardly as shown in Fig. 11, will cause the portions 69 of the cams to move away from the face 69' and the portions 70 of said cams to move against the finger 71' and thus force the rod rearwardly, simultaneously to move all of the bars 48 and cause the release of the lugs S. The release of the lugs is intended to be effective when the device 40 is in proper position over the bed-plate 13, that is, when the lug-holding pockets 60 of the device 40 are in exact vertical alignment with the slots 15 of the dies 10. Consequently, suitable means must be provided for accurately locating the device as it is brought to position on the bed of the machine 1.

In the small-scale view of Fig. 12, there is seen the bed-plate 13 and the die-plate 7' as arranged to receive the device 40. There, it will be noted that the side supports or rails 42 and 43 of the device 40 are spaced apart a distance substantially that of the width of plate 7'. By this arrangement, the device may be slid over the bed-plate effectively to straddle the die-plate 7' and thus be adjusted for sidewise location as well as for height, as is seen in the last mentioned figure. Adjustment for the front to back location of the device is obtained by the provision of suitable stop-means 13' and 13'', respectively located at the back and at the front of the plate 13. As viewed in Fig. 14, the device 40 is intended to be brought to position at a tilted angle, and thus slid over the plate 7' until its forward portions 42' and 43' abut each against the respective rear stop 13'. Then, it is let-down to rest on the plate 13, so that the notches 42'' and 43'' in the rails will register with their respective front pins 13''. The notches 42'' and 43'' are wider than the pins, and if the device be first held against the abutments 13', the notches will so engage the pins 13'' as to permit a slight movement of the device forwardly, see Fig. 15. This movement is intended to be effected after the handle 65 has been operated to release the lugs S. It is effected by pulling said handle, and the purpose of such movement is to open the pockets 60 equally as respect to the slots 15. For instance, after the device is first brought into abutment against stops 13' and the notches have registered with the stops 13', the handle 65 is raised to cause the portions 58, forming the left sides of the pockets, to move toward the rear, or to the left viewing Fig. 15. This will cause a release of the lugs, but then, the heads 25 of the lugs will have a tendency to rub or friction against the sides 57 forming the right side of the pockets. Consequently, immediately after raising the handle, the operator will pull on the same to cause the device 40 to be moved slightly forwardly, that is moved to the limit permitted by the extent of the notches 42'' and 43'' with respect to the pins 13''. This movement is necessarily small but is sufficient to centralize the faces 58' and 57' with respect to the openings 15.

As may now be seen, the formation of the head 25 of the lug S is of great importance in providing the means whereby I may handle the same, in number through the devices explained, for quickly loading the machine for mass production. The chosen rectangular cross-section of the head 25 furnishes an advantage in orienting the lug in the conforming magazine, so that a number of lugs inserted in said magazine are automatically aligned with the slots 45, providing the magazine is held axially aligned, as is shown in Fig. 16. If the head were round or circular in cross-section, it would be necessary to orient each lug, and similarly axially orient the round tube or magazine with respect to the slots 45. While known means may be provided for this purpose, it will be recognized that an angular cross-section conformation of the head 25 is desirable. The length of the magazine 30, is preferably one which will furnish a sufficient number of lugs to fill a device 40. In order to distribute or to load the lugs of the magazine into the device 40, I provide an outlet controlling means comprising the handle 75, which is pivoted at 76 and urged, by a spring 77, in the direction indicated. This causes the lower end 75' of said handle to press against and hold the bottom lug as shown in Fig. 16.

When it is desired to load the device 40 with the lugs, the magazine 30 is held in a vertical position with its lower end thereof resting in the end region of any one of the grooves 44. Then, the handle 75 is pressed to cause its lower end to disengage the bottom lug. The magazine is then slid along the groove, and upon moving over a slot 45 the bottom lug will fall thereinto and be held as shown in Fig. 15. The top of the head 25 of the lug is then in the plane of the bottom of the groove and consequently the sliding movement of the magazine may subsequently continue so uninterruptedly to fill all of the slots 45. This is, of course, repeated for all of the grooves 44 of the device 40. It is obvious that a repression or release of the handle 75 be effected each time the operator moves the magazine from one groove 44 to another.

My invention is of course not intended to be limited to the specific form and application described above. It is, therefore, desired that only such limitations shall be imposed therein as are indicated in the appended claims.

What I claim is:

1. In the loading of a gang molding machine of the character described, the combination of means comprising a portable rack having a multiplicity of pockets arranged in corresponding location with the cavities of said machine and adapted to receive loading elements to be later transferred into the machine, and a distributing magazine unit for orientedly holding a column of said elements; said device having grooves made along its surface for inter-connecting said pockets in a manner to guide and orient said magazine in the distribution of the elements into the said device.

2. The method of producing molded plastic articles having metallic inserts joined thereto in the molds, which consists; providing a molding press having a multiplicity of molding stations in the form of cavities, each provided with a respective recess for retaining a respective one of said inserts; providing a portable device having a frame registerable with said molding press and in which frame are provided a multiplicity of controllable recesses corresponding in location with the recesses of the said cavities and adapted to be controlled in a manner to retain or to release said inserts; providing a tubular device for storing said inserts in file-formation whereby the same may be distributed into the recesses of said frame; providing guide means on the surface of said frame; then moving the outlet end of said magazine along said guide means quickly to distribute the inserts into the recesses of said frame; registering said frame with the plate of said press, releasing the inserts, removing the frame, and then placing the molding material in the cavities and closing the press under heat and pressure.

3. A portable apparatus for use in loading a molding machine with lugs of the character herein described, comprising a main plate having portions thereof formed to register with the multi-cavity bed-plate of said machine; said main plate having rows of apertures made into its face and extending through its thickness for admitting each a lug into said apparatus; a pair of members associated with each row of said apertures and located beneath said plate; one of said members being held secured to the said plate and the other arranged for movement with respect to the plate; said members having each a series of indentations cooperative with the indentations of the other to form rows of adjustable pockets correspondingly in alignment below the apertures of each of said rows; means connecting all of the movable members associated with the rows, and a common means, pivoted on the said main plate and connected with said first means for simultaneously controlling the adjustment of the said pockets whereby the lugs admitted through said apertures will be effectively held into or released from said apparatus.

4. A device for loading a multi-cavity mold with lugs of the character herein described, comprising in combination: a plate having side members for supporting and registering the same over and at a predetermined distance above the bed of the mold; a multiplicity of lug-admitting holes through said plate; pocket-forming means below said plate, in alignment with said holes, for releasably holding the lugs into the device; said pocket-forming means comprising each a pair of downwardly extending projections having each a respective side face adapted to complement that of the other in a manner to form a pocket; one of said projections being movable with respect to the other and its respective hole in the said plate.

5. The device of claim 4, in which the movable one of said projections is an off-set portion of a bar, movably supported by the plate of the device, and provided with a multiplicity of off-set portions to form a multiplicity of movable projections.

6. The device of claim 4 in which a bar is used for each row of holes in said plate and a common means is used to move said bars with respect to said plate.

7. The device of claim 4 in which the said common means is a member pivotally mounted on the said plate and adapted to be used as a handle for sliding the device along the bed of said mold.

8. The subject matter as claimed in claim 3, wherein the normal position of said common means is effective to retain the said movable members in position to adjust said pockets in a manner to hold the said lugs in position to close the said apertures flush with the surface of said main plate.

ROBERT O. WOOD.

REFERENCES CITED

The following references are of record in the file of this patent:

UNITED STATES PATENTS

| Number | Name | Date |
|---|---|---|
| 1,590,080 | Carter | June 22, 1926 |
| 1,590,116 | Northrop | June 22, 1926 |
| 1,740,968 | Carter | Dec. 24, 1929 |
| 2,061,506 | Cox | Nov. 17, 1936 |
| 2,321,252 | Sayre | June 8, 1943 |